United States Patent Office 2,758,954
Patented Aug. 14, 1956

2,758,954

STABLE MIXTURE OF DIETHYLPARANITRO-
PHENYLTHIONOPHOSPHATE AND SOLID
EXTENDER AND METHOD OF MAKING
SAME

Calvin M. Tidwell, Medina, N. Y., assignor to Food Machinery and Chemical Corporation, San Jose, Calif.

No Drawing. Application January 4, 1952,
Serial No. 265,051

4 Claims. (Cl. 167—30)

The present invention relates to compositions with solid extenders such as bentonite and related absorbent clays, of organic phosphate compounds of the type described in the Fiat Final Report 949 and in Fletcher Patent 2,520,393 granted August 29, 1950.

The organic compounds are phosphate esters which possess insecticidal, fungicidal and rodenticidal properties. These phosphate esters conform to the general formula

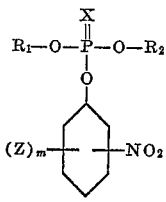

in which $R_1$ and $R_2$ are chosen from the group consisting of alkyl, aralkyl and aryl radicals, Z is a member of the group consisting of halogen and alkyl radicals, and $m$ represents an integer not greater than 2 and wherein X is a member of the group consisting of oxygen and sulfur.

The organic radicals in these compounds, that is $R_1$ and $R_2$ may be the same organic radical although they are identified as representing different organic radicals. It will be understood that when the organic radical R is an alkyl radical, it may represent either a straight chain or a branch chain, a saturated or unsaturated or a cycloaliphatic hydrocarbon radical and, furthermore, the hydrocarbon radicals may be substituted as halogens as, for instance, chlorine or bromine.

For purposes of illustrating the present invention, particular reference will be made herein to diethylparanitrophenylthionophosphate. This particular thiophosphoric acid ester is chosen as illustrative of the invention herein by reason of the fact that of this group of phosphate compounds, it possesses outstanding insecticidal and fungicidal activity.

This group of insecticidal and fungicidal compounds are normally employed, admixed and extended with adsorbent clays of the type of bentonite, montmorillonite and argillaceous fuller's earth and talc, all designated herein as inorganic extenders and, as bentonite possesses certain advantageous properties of the clays of this group, will be employed illustratively herein to describe certain principles of the invention.

These normal formulations of the phosphate esters are prepared by blending, grinding or suspending from 1% to 5% of the phosphate compound in the extender. It has been found, however, that these formulations are not shelf-stable as the physiologic activity of the complete formulation decreases with time.

It is an object of the present invention to prepare formulations with an inorganic extender of the phosphate ester to produce a powder mixture of substantially uniform physiologic activity with time, and an active dust therefore which is shelf-stable.

In accordance with the present invention, the inorganic extender, such as clay, is treated with a gaseous material which with water forms a weak acid, with the weak acid itself or an acid salt thereof which reacts acid in aqueous solution or slowly evolves the gaseous material. Carbon dioxide and sulfur dioxide are excellent gaseous acid anhydrides that are effective for the purposes of the invention. The gaseous stream of sulfur dioxide or carbon dioxide is either moved through the inert inorganic extender, such as clay, or the extender moved through an atmosphere of the gas.

It has been found that the clay will take up a maximum amount of the acid anhydride and that further time of contact is of no value.

The sulfur dioxide, for instance, may be used as 100% sulfur dioxide or may be used in admixture with a gaseous atmosphere and, in fact, if flue gases containing a fractional per cent of sulfur dioxide be available, such flue gases may be employed advantageously as the treating agent since both sulfur dioxide and carbon dioxide are thereby employed.

In the course of the treatment of the inorganic extender, such as clay, the pH of the clay drops to a relatively low pH and in the range 4.0 to 6.0 when employing sulfur dioxide. Thereafter, no additional sulfur dioxide appears to be absorbed by the clay. Carbon dioxide alone causes the pH of the clay to decrease to a pH in the range 5.5 to 7.5.

*Example I*

As a specific example purely illustrative of the invention and not limitative thereof, 500 lbs. of bentonite were tumbled in a rotating cylinder through which flue gas containing 0.25% $SO_2$ was passed continuously. The temperature of the equipment was room temperature and the gas was passed for a period of one hour, at which time the pH of the bentonite, as measured by electrometric methods, had dropped from 9.6 to 7.4.

This material was ground and blended with sufficient diethylparanitrophenylthionophosphate to produce a content of that active ingredient of 3.25%. The fineness of grinding was such that 90% would pass a 325 mesh sieve. This was designated Sample A.

Another sample was made of the same fineness and same content of the identical active ingredient with bentonite which had not been treated with sulfur dioxide. This was designated Sample B.

Each of these samples was permitted to stand in identical containers at a temperature of 75° F. for 218 days and the amount of phosphate ester then determined by a modification of the Assay method as described in Bulletin T-110 of American Cyanamide Company, Stamford Research Laboratories. The modification consisted in using a Beckman D. U. spectrophotometer at 402 millimicrons instead of a photoelectric colorimeter at 400 milli-microns.

The quantity of active ingredient expressed in terms of per cent of the original quantity was as follows:

| | Percent |
|---|---|
| A. Bentonite treated | 94.6 |
| B. Bentonite untreated | 75.1 |

The sample of active dust produced from bentonite treated with $SO_2$ lost only 5.4% of its active ingredient on standing at room temperature for 218 days, in contrast with Sample B, the untreated sample which lost 24.9 or almost 5 times as much.

*Example II*

Additionally to illustrate the principles of the invention, a clay from Georgia of the attapulgus type, when used as an extender for diethylparanitrophenylthionophosphate showed a degradation of the active ingredient in a dust initially containing 1% of active ingredient, of 48% after standing 70 days at 100° F.

A part of this clay was exposed to sulfur dioxide until the clay was saturated therewith and until the pH of the clay had dropped to approximately 4.5, whereupon the active ingredient was blended into the clay, packaged and stored at 100° for 70 days. The dust product was then analyzed for active ingredient, in accordance with the method mentioned above, and the per cent of degradation of active ingredient determined as 5%. This is in contrast to a practically 50% degradation in the same period of time when using the untreated clay.

*Example III*

A dust formulation of talc with 1% of active ingredient when stored for 70 days at 100° F. suffered a 27% degradation of active ingredient. A sample of the same talc, when saturated with sulfur dioxide gas and stored for the same period of time at 100° F. suffered a degradation of active ingredient of only 7%, all determinations being made in accordance with the method outlined above.

In lieu of the employment of sulfur dioxide gas as the conditioning material for the inorganic extender, it is possible to use other materials as a source of sulfur dioxide as, for instance, the water soluble bisulfites. The following experiment is designed to show the production of properly conditioned dusts by treating the same with sodium acid sulfite. However, it is believed that the sulfur dioxide treatment may be preferred by reason of the ease with which clay may be treated uniformly throughout its bulk with flue gas, as contrasted with attempts to blend the whole bulk of the clay with a water soluble bisulfite.

An additional practical disadvantage in the employment of sulfite if in solution over sulfur dioxide is the necessity of subsequently drying the clay prior to blending it with the active ingredient.

*Example IV*

An amount of sodium acid sulfite corresponding to one part by weight per hundred parts by weight of talc was incorporated in ground talc by blending in an Osterizer and the resultant product employed as an extender for the phosphate ester in preparation of the standard 1% active ingredient dust formulation.

This formulation was packaged and stored for 70 days at 100° F. After the storage period the sample was analyzed for active ingredient which was found to be present to the extent of 94% of the original showing a degradation in 70 days of only 6% in contrast with a degradation of 27% in a talc dust formulation stored at this same temperature and for the same period of time in ordinary or untreated talc.

*Example V*

A sample of the clay used in Example II having a pH of 8.4 was saturated with dry $CO_2$ gas. The pH of the treated clay was 7.1. To show that the gas was tightly adsorbed a sample of the treated clay was spread out in a thin layer and exposed to the air for 36 hours. The pH was still 7.1.

A dust formulation containing 2% of the active ingredient was prepared from this treated clay and stored at 110° F. This material suffered a 2% degradation of the active ingredient in seven days. A check sample prepared from the original untreated clay suffered an 11% degradation in the same period.

In all instances of the treatment of these clays, a reduction in the pH occurred whether the same be treated with sulfur dioxide gas or with soluble sulfite such as sodium acid sulfite to produce a clay with a pH in the neighborhood of 5 and generally from about 4.0 to 6.0.

It is not known at this time what the exact function is that is performed by the sulfur dioxide or carbon dioxide but, in any event, such treatment appears to so condition the clay that the normal degradation of active phosphate ester of the type described above is very greatly decelerated. This deceleration is of sufficient extent to permit the packaging of dust formulations with this active ingredient at periods of time considerably in advance of the time at which the formulation is to be used. The conditioning appears to be suitable for materials such as talc, for bentonite and for other argillaceous extenders generally.

What is claimed is:

1. The method of producing a shelf stable dust formulation of diethylparanitrophenylthionophosphate and a finely divided adsorbent clay, which comprises first saturating the clay with a gaseous acid anhydride and subsequently uniformly blending the saturated clay with said thionophosphate as the active ingredient.

2. The method of producing a shelf stable dust formulation of diethylparanitrophenylthionophosphate and a finely divided adsorbent clay which comprises first saturating the clay with sulfur dioxide and subsequently uniformly blending the saturated clay with said thionophosphate as the active ingredient.

3. The method of producing a shelf stable dust formulation of diethylparanitrophenylthionophosphate and a finely divided adsorbent clay which comprises first saturating the clay with carbon dioxide and subsequently uniformly blending the saturated clay with said thionophosphate as the active ingredient.

4. A shelf stable dust formulation of diethylparanitrophenylthionophosphate and a finely divided adsorbent clay, wherein the clay is saturated with a gaseous acid anhydride and uniformly blended with the said thionophosphate.

References Cited in the file of this patent

UNITED STATES PATENTS

| | | |
|---|---|---|
| 2,520,393 | Fletcher | Aug. 29, 1950 |

FOREIGN PATENTS

| | | |
|---|---|---|
| 655,875 | Great Britain | Aug. 8, 1951 |
| 266,295 | Switzerland | Apr. 17, 1950 |